United States Patent

[11] 3,582,912

[72] Inventors Jean Valin
Le Roi;
Jean-Claude Bruyere, Sayssinet, both of, France
[21] Appl. No. 711,806
[22] Filed Mar. 8, 1968
[45] Patented June 1, 1971
[73] Assignees Centre National De La Recherche Scientifique
Paris, France;
Compagnie Internationale Pour L'Informatique
Louveciennes, France
[32] Priority Mar. 29, 1967
[33] France
[31] 100738

[54] THIN FILM MAGNETIC INFORMATION STORES
30 Claims, 24 Drawing Figs.

[52] U.S. Cl. .......... 340/174, 29/196, 29/196.1, 29/198, 148/31.55
[51] Int. Cl. .......... B32b 15/18, G11c 11/14
[50] Field of Search .......... 340/174 TF; 148/31.55, 108; 117/71, 237, 240; 29/196.1, 198, 194, 196; 75/170, 171

[56] References Cited
UNITED STATES PATENTS

| | | | |
|---|---|---|---|
| 3,399,129 | 8/1968 | Flur et al. | 204/192 |
| 2,988,466 | 6/1961 | Meiklejohn | 148/6.3 |
| 3,110,613 | 11/1963 | Bean | 117/71 |
| 3,139,608 | 6/1964 | Doughty | 340/174 |
| 3,141,920 | 7/1964 | Bebb et al. | 88/1 |
| 3,375,091 | 3/1968 | Feldtkeller | 29/194 |
| 3,423,740 | 1/1969 | Barrekette et al. | 340/174 |

*Primary Examiner*—James W. Moffitt
*Attorney*—Kemon, Palmer and Estabrook

ABSTRACT: In a binary data information store, a multibit storage member in the form of a thin film magnetic structure includes at least one layer of ferromagnetic alloy and one layer of antiferromagnetic alloy, both of which are magnetized with identically orientated uniaxial anisotropy axes with hysteresis cycles which are substantially rectangular in the direction of said axes, the two layers are magnetically coupled in such a way that, once an information pattern impressed in the antiferromagnetic alloy layer, a corresponding information pattern is preserved in said ferromagnetic alloy layer irrespective of parasitic fields tending to variations of magnetization conditions, such for instance as any demagnetizing fields, and of temporarily localized variations of magnetization which may occur during readout operations.

INVENTORS
Jean Valin
Jean Claude Bruyere
BY
Kemon, Palmer & Estabrook
ATTORNEYS

INVENTORS
Jean Valin
Jean Claude Bruyère
BY
Kemon, Palmer & Estabrook
ATTORNEYS

INVENTORS
Jean Valin
Jean Claude Bruyere
BY
Kemon, Palmer & Estabrook
ATTORNEYS

THIN FILM MAGNETIC INFORMATION STORES

SUMMARY OF THE INVENTION

The invention concerns improvements in or relating to thin film magnetic structures possessing uniaxial anisotropy and substantially rectangular hysteresis cycles in the direction of the anisotropy axis. These structures are essentially for use in binary data information stores which include to appropriate means to read-in and readout.

The object of the invention is to provide such information stores wherein the thin film magnetic structures present substantially rectangular hysteresis cycles which can be laterally shifted in one or the opposite direction of orientation of the anisotropy axis, which is an axis of "easy" magnetization, whereby a selectively localized conditioning can be controlled in such structures for imparting to memory points thereof either one or the other of two magnetic conditions which may be considered as respectively representing the digital values 0 and 1.

It is a further object of the invention so to provide such structures that, once conditioned, the information pattern cannot be damaged or destroyed from any possible readout operations or any possibly existing parasitic demagnetizing fields, even though the information pattern can be voluntarily modified, when required, using specially provided erasing and re-read-in operations. Stores according to the present invention therefore may be classified as the semipermanent type.

Broadly stated, a thin film magnetic structure according to this invention is mainly characterized in that it comprises, in magnetic coupling interaction, at least one layer of ferromagnetic character and one layer of antiferromagnetic character. Such layers may directly contact one another or a very thin layer of nonmagnetic material may be inserted between them.

A "thin" film or layer as herein understood has a thickness between some hundreds and some thousands of Angstroms; whereas a "very thin" layer is of less thickness.

In a magnetic structure according to this invention, a further layer of ferromagnetic character may be applied over the one associated with the layer of antiferromagnetic character, in accordance with the teachings of French Patent 1,383,012 filed Oct. 18, 1963, in the name of Center National de la Recherche Scientifique, inventors Louis Neel, Jean-Claude Bruyere, Olivier Massenet et Robert Montmory, for "Thin Film Magnetic Structures and Their Application to Magnetic Stores." According to this patent, a pair of ferromagnetic material layers are associated with the interposition of a very thin layer of nonmagnetic metal, such as silver, indium, chromium, manganese, palladium or platinum.

Since a store according to the present invention is of the semipermanent type, the read-in means form no part of the structure of the store proper. On the other hand, the readout arrangement either of the electrical conductor array type or of the opto-electrical sensor type, may be considered as forming part of the overall arrangement of the store.

BRIEF DESCRIPTION OF DRAWINGS

FIG. 16 shows such a cycle with a left-hand shift and FIG. 1*c* shows such a cycle with a right-hand shift;

Figure 1B:
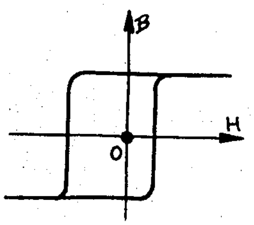

In the drawings, and for the sake of clarity, relative dimensioning is not observed.

Figure 1A:
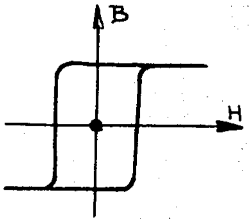
FIG. 1*a* shows a hysteresis cycle along the easy magnetization axis of a structure according to the invention.
Figure 1C:
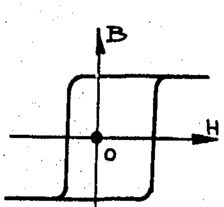

In FIG. 1 the graphs illustrate the actual purpose of the invention, i.e. they provide a representation of the binary digits 1 and 0 from shifting hysteresis cycles in the magnetic materials, said cycles being substantially rectangular in the direction of easy magnetization of the materials. Each cycle is shown with the induction B as ordinates plotted against the magnetic field H as abscissae. Once an information pattern is read into the store, the binary digits will be represented by distinct magnetic conditions corresponding to one pair of hysteresis cycles of FIGS. 1*a* and 1*b*, or FIGS. 1*b* and 1*c*, or FIGS. 1*a* and 1*c* depending upon to the magnetic structure conditioning applied during a read-in operation of digits 1 and 0.

Figure 3:
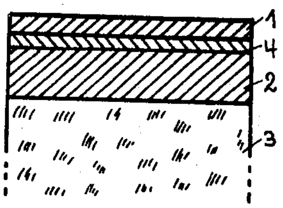
Figure 4:
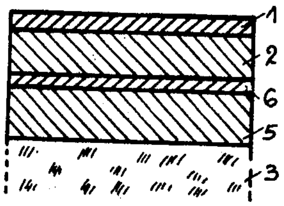
FIG. 4 shows a further arrangement according to the invention which embodies a further ferromagnetic layer.

For such a purpose, the invention provides a composite structure in which magnetic coupling, of a kind hereinafter defined, is made between a ferromagnetic layer 2, FIGS. 2, 3, 4 or 12, and an antiferromagnetic layer 1, in these same FIGS. In FIGS. 2, 4 and 12, layers 1 and 2 contact one another (and even, as will be later described more intimately united than a mere surface to surface contact). In FIG. 4, the structure includes, when required, a further ferromagnetic layer 5 coupled to ferromagnetic layer 2 with the interposition of a thinner nonferromagnetic material 6. In FIG. 3, layers 1 and 2 are coupled through a very thin layer 4 in a conductive nonmagnetic material, the layer 4 having a thickness of some tens Angstroms.

Figure 5:
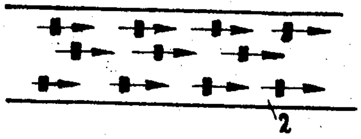
FIG. 5 shows the distribution of magnetic moments in uniaxial anisotropic layer of ferromagnetic character.

As is known, in a ferromagnetic material which is magnetically saturated in a direction of orientation, the magnetic momentums attached to the atoms of the material are all aligned in parallel fashion due to the existing molecular field having a value of several millions of Gauss. Each pair of neighboring atoms is submitted to a positive interaction of the exchange type and this condition is illustrated in FIG. 5.

Figure 6:
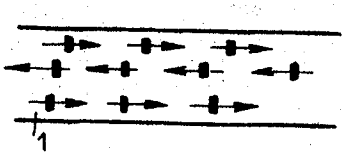
FIG. 6 shows the distribution of magnetic moments in a uniaxial anisotropic layer of the antiferromagnetic character.

As is also known, in an antiferromagnetic material which is similarly saturated, the exchange interaction is a negative one. Considering the layer to be divided in thin parallel planes wherein atoms of similar nature are arranged, the magnetic momentums are aligned parallel to each plane but with reversed orientations from plane to plane. Such a condition is illustrated in FIG. 6. A remarkable feature of such materials with respect to the invention is that the stability of their magnetic condition is absolute unless the material is heated up to a temperature at least equal to a value, characteristic of the metallic composition of said material, which is defined as being the temperature at which the atoms are disorderly arranged in a massive slug of such materials. Stated otherwise, such temperature is one at which the arrangement of such atoms varies at random.

Figure 2:
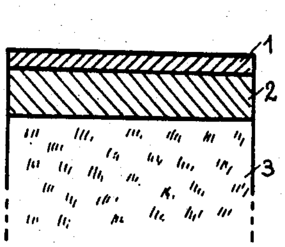
FIGS. 2 and 3 respectively show arrangements of magnetic store structures according to the invention.
Figure 7:
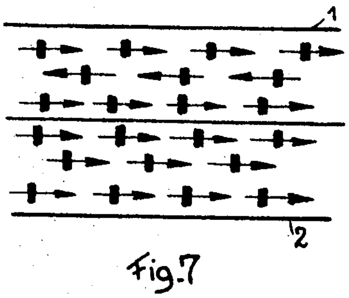
FIGS. 7 and 8 respectively show the distribution of the magnetic moments in coupled layers of ferromagnetic and antiferromagnetic materials of uniaxial anisotropy, with respect to the orientation imparted to such magnetic moments in the ferromagnetic layer during the read-in operation.
Figure 8:
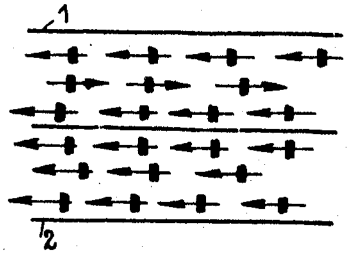

Consider for instance a composite structure of the type shown in FIG. 2 (the result will be the same for a structure according to FIG. 3), wherein the ferromagnetic layer is formed with a uniaxial anisotropy axis, a well-known arrangement per se. If such a structure is heated to the aforementioned temperature, usually denoted by $T_N$, or a higher temperature, of the antiferromagnetic material 1 with an externally applied magnetic field acting on both layers and oriented along the said anisotropy axis and the structure is then cooled in the presence of the magnetic field. In the antiferromagnetic material the momentums orient in such a distribution that in the plane near the ferromagnetic surface they align on the momentums in the ferromagnetic material. FIGS. 7 and 8 show such distributions for reverse conditions of the external magnetic field. Then following cancellation of the applied field, and at any temperature lower than $T_N$, due to the strong magnetic interaction created between the two layers, the ferromagnetic layer preserves in its entire thickness the memory of the magnetic condition of the antiferromagnetic material. In other words, the stable condition of magnetization in the ferromagnetic layer, corresponding to a minimum energy, is made dependent upon the direction and orientation of the magnetic momentums of the surface plane network of the antiferromagnetic layer adjacent to the ferromagnetic layer.

Such stability of magnetization demonstrates that the easy magnetization axis of the ferromagnetic material was made unidirectional along the orientation line of the external magnetic field temporarily applied during the heating and cooling stages of activation. Hence the hysteresis cycle of the ferromagnetic layer was shifted in the direction shown in the graph of FIG. **1*b* for the condition shown in FIG. 7, and in the direction shown in the graph of FIG. 1*c* for the condition shown in FIG. 8**.

Consequently the structure acts as if the ferromagnetic layer 2 in FIGS. 2, 3, 4, 9 and 12, in its interaction with layer 1 of antiferromagnetic character, is submitted to a fictitious magnetic coupling field $H_t$ oriented along one direction of the easy magnetization axis; such a coupling field being of a value depending on the quality of the materials of said layers 1 and 2 and the above-described processing operation.

Figure 16A:
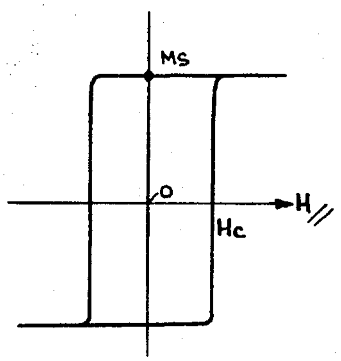
FIGS. 16*a*, 16*b*, 17*a*, 17*b*, 18*a* and 18*b* are graphs useful in explaining the operation of stores in accordance with the present invention.
Figure 16B:
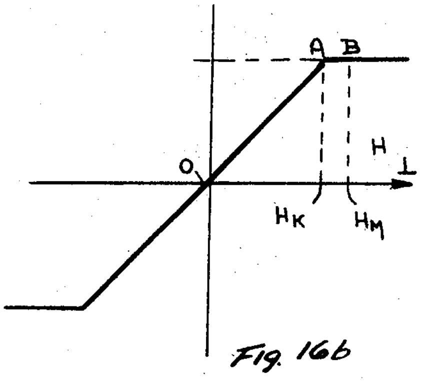

In FIG. **16*a*, shows the hysteresis cycle as measured along the direction of easy orientation of magnetization in a normal uniaxial ferromagnetic layer. FIG. 16*b*** shows the cycle of such a layer along the perpendicular direction. $H_{//}$ denotes the magnetic field in the direction of the axis of easy magnetization and H , the magnetic field in the direction perpendicular thereto. The component M of the magnetization of the layer in the direction of the magnetic field is plotted as ordinates.

Figure 17A:
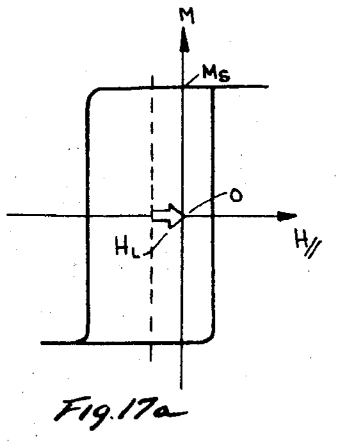
Figure 17B:
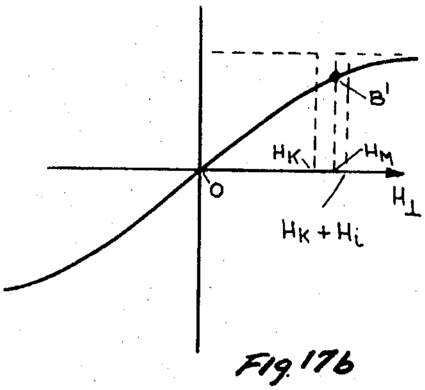

FIGS. **17*a* and 17*b*, respectively show the hysteresis cycles in the direction of easy and "difficult" magnetization for a layer which is not strongly coupled, i.e. a layer the coupling field $H_t$ of which is lower than, or of the same order of magnitude as, the anisotropy field $H_K$ of the ferromagnetic layer. FIG. 17*a* further shows the coupling field $H_t$ from the shift of the cycle along the direction of easy magnetization. In FIG. 17*b*** the full line cycle is the cycle for the low coupling layer.

FIGS. **18*a* and 18*b***, respectively, show the hysteresis cycles along the easy and difficult directions of magnetization for a ferromagnetic layer presenting a high degree of coupling, i.e. the coupling field $H_t$ much higher than the anisotropy axis $H_K$.

Figure 18A:
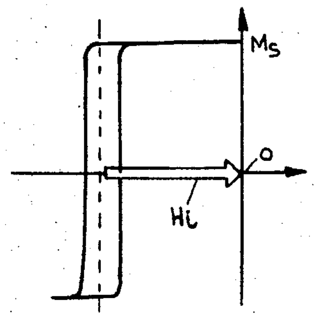
Figure 18B:
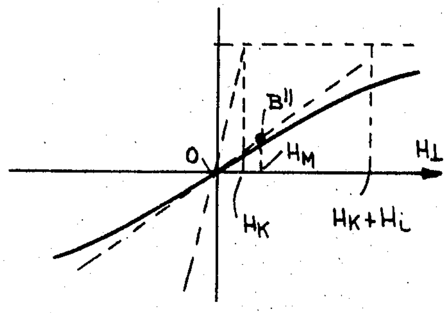

In FIGS. **16*a*, 17*a* and 18*a*, $M_S$ denotes the value of saturation of the magnetization. In FIG. 16*b*, point A defines the value of the anisotropy field $H_K$ and point B defines the value of the "word" field M (as hereinbelow defined). In FIGS. 17*b* and 18*b*, points B′ and B″ correspond to point B of FIG. 16*b***. The slopes of the tangents at the origin of such cycles at (*b*) in said FIGS. , i.e. the initial susceptances of the ferromagnetic layer, depend on the ratio $M_S/(H_K+H_t)$.

Various methods, to be hereinafter described, ensure the storing of a pattern of information bits at as many memory points, preferably arranged in rows and columns as usual in the art of binary data information stores, each row (or line) representing a complete word in the pattern.

Figure 9A:
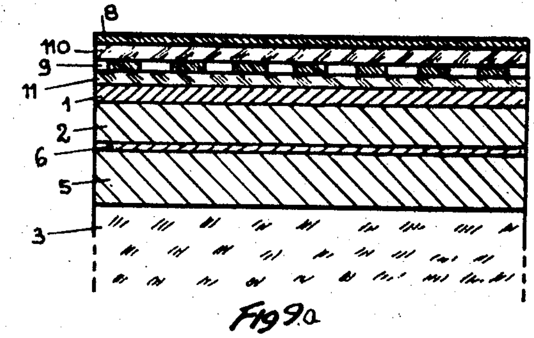
FIG. 9*a* shows a cross section of a store in accordance with the present invention which includes readout conductor arrays associated with a magnetic storage structure.
Figure 9B:
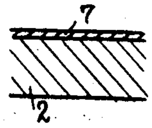
FIG. 9*b* is illustrative of a partial temporary condition of the magnetic structure at one stage of the manufacture of the store.
Figures 10, 11, 12:
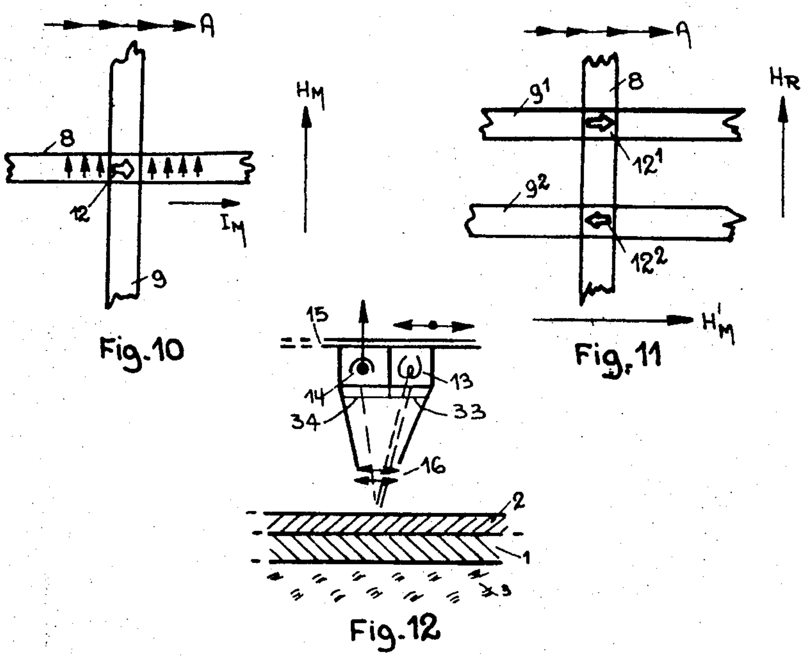
FIGS. 10 and 11 respectively show graphs relating to two ways of reading out information from a store of the type shown in FIG. 9.
FIG. 12 shows an embodiment of a store provided with an opto-electronic sensing readout.

When, as shown in FIG. 9, a structure according to the invention, for instance according to FIG. 4, is associated with two arrays of conductors, rows 8 and columns 9, the crossovers defining the memory points, a readout operation may be provided according to either FIG. 10 or to FIG. 11.

FIG. 10 shows a memory point 12 at the crossover of two conductors 8 and 9. The direction of the anisotropy axis is shown at A. Conductor 8 is a word line, i.e. a line along which are distributed the binary digits of an information word. Conductor 9, a column conductor, is orthogonal to conductor 8 and spans over as many conductors as there are words in the store.

In order to read out a word, a current $I_M$ is applied to line 8. This generates a magnetic field $H_M$ in a direction perpendicular to that of conductor 8 and the anisotropy axis of the ferromagnetic layer of the structure. The magnetic field $H_M$ is of the same order of magnitude as the anisotropy field $H_K$ of the "readout" ferromagnetic layer, i.e. layer 5 of FIG. 9 for instance. The magnetization of the memory point in FIG. 10 is shown by an arrow of same orientation as the current $I_M$, corresponding for instance to a binary digit 1 (the orientation would be reverse for a binary digit 0). Under the action of the word field $H_M$ the magnetization of the ferromagnetic layer underlying the crossover point 12 rotates by an angle which will be hereinafter defined, as indicated by full line arrow; the direction of rotation obviously depends on the relative orientations of the primary magnetization at 12 and of the current $I_M$. An electrical current, the polarity of which depends on the direction of rotation is thereby induced in the conductor 9 from which it will be picked out as a readout signal of the digital content of the memory point 12. An electrical current of substantially identical magnitude but of reverse polarity will be picked off from any conductor 9 activated from a memory point, such as 12, wherein the digital value is a 0. When current $I_M$ disappears, the condition of magnetization of the concerned memory point in the ferromagnetic layer returns to its former state as, of course, the operation occurs at a lower temperature than the disorder temperature of the antiferromagnetic layer so that said antiferromagnetic layer preserves the orientation of the magnetic momentums in its network contacting the ferromagnetic layer. Consequently, the complete memory point 12 returns to the preserved condition.

The magnitude of the current in a conductor 9 depends on the value of the angle of rotation of the magnetization in the ferromagnetic layer underlying the memory crossover point under the action of the word field $H_M$, equal to or slightly higher than $H_K$. In a ferromagnetic layer with zero coupling, the angle of rotation equals 90° and the electrical current in conductor 9 is at its maximum value. In such a case, the hysteresis cycle followed by the magnetization during the readout operation is as shown at OAB, in FIG. **16*b***.

For a low coupling ferromagnetic layer, the hysteresis cycle followed in similar conditions is shown in FIG. **17*b* at line OB′. In such a case, the magnetization of such a low coupling ferromagnetic layer rotates by an angle slightly less than 90° and the electrical current collected by the corresponding conductor 9 is slightly lower than the maximum current corresponding to a readout in a noncoupled layer. FIG. 9 shows an arrangement wherein the ferromagnetic layer 5 is slightly coupled to the ferromagnetic layer 2 through the metallic nonmagnetic layer 6, as explained in the above-mentioned French patent. On the other hand, the layer 2 is strongly coupled to the antiferromagnetic layer 1**.

For a strongly coupled ferromagnetic layer, as in FIG. 2, the hysteresis cycle followed in same conditions as above by the magnetization in the readout ferromagnetic layer is indicated by OB″, of FIG. **18*b***. In such a case, the angle of rotation of the magnetization in the ferromagnetic layer may be made as low as desired by an increase of the value of the coupling field $H_t$. Use of this possibility in the application of the invention will be herein after described.

It must be noted that, as the overall thickness of the thin film magnetic structure is very small, it is quite unimportant whether the antiferromagnetic layer is above or below the ferromagnetic layer or layers with respect to the conductor arrays.

As an alternative to the above-described readout operation, the orientations of the word and readout conductors may be reversed with respect to the axis of anisotropy in the ferromagnetic part of the store. In FIG. 11, conductor 8 is perpendicular to the anisotropy axis A and two readout conductors $9^1$ and $9^2$ are shown in parallel relation with respect to A. Two memory points of the store $12^1$ and $12^2$ are shown. For reading out an information word, a biasing magnetic field $H_R$ is applied perpendicularly to the anisotropy axis and, as in the prior system, an electrical current is applied to the conductor 8 for the generation of a magnetic field $H'_M$ which is orientated parallel to the direction of the easy magnetization axis of the underlying ferromagnetic layer. Under such conditions, the magnetization at the memory points rotates by almost 180° in one direction or the other depending upon its former orientation with respect to the axis A. The output electrical currents induced in conductors $9^1$ and $9^2$ are representative of the digital contents of the memory points $12^1$ and $12^2$ from their polarities. For instance, the digital values 0 and 1 were recorded at such memory points and the collected currents from conductors $9^1$ and $9^2$, while being of substantially identical magnitudes, will be of reversed polarities. After the readout the magnetizations at points $12^1$ and $12^2$ return to their former conditions because, as explained, the antiferromagnetic layer has preserved the information. The return is allowed provided the coupling field $H_t$ is higher than the coercive field of the ferromagnetic layer in which the magnetizations have been rotated for the readout.

As also known, a readout from a ferromagnetic store can be made without any recourse to control conductor activations. Opto-electrical readout means can be used as in the example shown in FIG. 12. A readout head, comprising for instance a light source 13 and a photoelectric member 14, a photocell or a photoconductance, is mechanically displaced for scanning the surface of the store in accordance with the pattern of information in the store. The light from the head is polarized at 33 and focused on the surface of the magnetic structure in which said outer surface is a ferromagnetic layer. The reflected light is directed back to the photocell 14 through an analyzer 34. The details of carrier 15 of such an opto-electrical readout head are not shown since it may be of any conventional type. The scanning may be controlled from any conventional mechanical arrangement. Of course, in lieu of a single displaceable readout head, one can substitute a mosaic of photocells or of photoresistances. Either a polarized light source for scanning the ferromagnetic surface, the reflected light pencil of which passes through an analyzer and falls on a line of word of said mosaic, or a polarized light source lighting the whole of the ferromagnetic surface and reflected back through optical analyzer means on the complete surface of the mosaic can be used, in which case the mosaic elements are activated according to a predetermined raster when such elements do not possess individual output leads. Such readout arrangements are also well known for scanning and reading-out "impressed" surfaces from opto-electrical or electronic methods.

The above description of reading out arrangements and methods are validly only when the read-in was such that the memory points were obtained with magnetic hysteresis cycles such as shown in FIGS. 1*b* and 1*c* and especially for the description of readout operations having recourse to conductor arrays. Consequently, the readout signals for the digit values 0 and 1 were assumed discriminated from their electrical polarities. Use may be made of read-in operations resulting in the discrimination between the digital values 0 and 1 from the hysteresis cycles shown in FIGS. 1*a* and 1*b* and FIGS. 1*a* and 1*c*. The readout will then give no signal for all memory points wherein the magnetization will follow the cycle of FIG. 1*a* and a signal, whatever its polarity may be, for all memory points wherein the magnetization follows the cycle of FIGS. 1*b* or 1*c*. Such a discrimination is only possible when the shift of the hysteresis cycle is substantial with respect to that shown in FIG. 1*a*, that is to say when the coupling is tight between the ferromagnetic and antiferromagnetic layers in the structure. When readout in accordance with FIG. 10, the hysteresis cycles in the perpendicular direction to the anisotropy axis will be such as shown in graph FIG. 16*b* for uncoupled memory points and such as shown in FIG. 18*b* for the tight coupling memory points.

Figure 13:
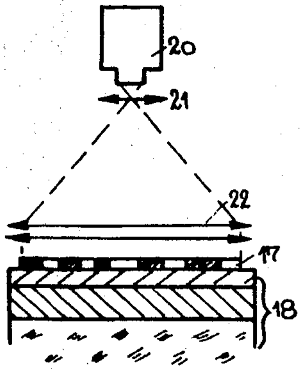
FIGS. 13 and 14 show one form of read-in arrangement for the stores.
Figure 14:
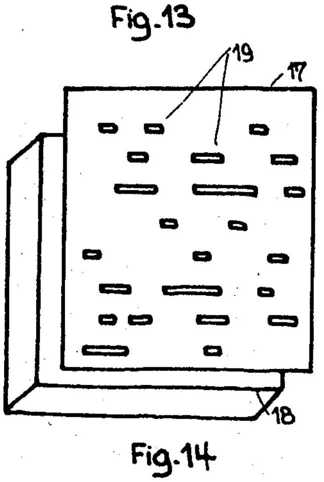

The read-in operation in any magnetic structure according to the invention is based on controlled heating in the presence of an orientating magnetic field. FIGS. 13 and 14, on the one hand, and FIG. 15, on the other hand, show two different possibilities for reduction to practice of such a read-in operation.

In FIGS. 13 and 14, recourse is had to a perforated mask 17 the perforations of which are made according to a predetermined encoding pattern. For instance, the perforations which are illustratively shown at 19 in an obviously simplified pattern, for the sake of clarity, correspond to memory points wherein digital values 1 must be read-in. The magnetic structure, including its dielectric carrier, is shown as 18. A source of heat, such for instance as a ruby type Laser, is indicated at 20 and has its coherent light beam directed through optics 21 so that it will take the form of a sheet of parallel ray light spanning over the entire area of the mask 17 and said mask is in close proximity to the surface of the magnetic structure 18. Preferably, said mask and said surface are of substantially identical areas in order to avoid the necessity of an additional optical focusing arrangement between the mask and the surface.

Considering the magnetic structure 18 having its antiferromagnetic and ferromagnetic layers magnetically unorganized, the laser device is activated for the time interval necessary to heat the parts of the structure under the perforations of the mask up to the disorder temperature of the antiferromagnetic material while an orientating magnetic field is applied to the magnetic structure. The magnetic field must have a constant and predetermined direction, preferably along one of the two directions of the anisotropy axis of the ferromagnetic part of the structure, which axis is of a direction parallel to an edge of the structure 18. The material of the mask 17 may, for instance, be nickel. The source is only "on" for a time interval sufficient to bring the above-defined memory points to a temperature higher than the disorder temperature of the antiferromagnetic layer so that the structure thereafter cools in presence of the said orientating magnetic field. Such a read-in operation results in the read in of all the digits of the binary digital value 1, for instance, as defined by the orientation of the applied magnetic field.

This single read-in operation is considered as sufficient for structures presenting a tight coupling between the antiferromagnetic and ferromagnetic layers, as is for instance the structure of FIG. 2. Any readout in accordance with FIGS. 9 and 10, or 11, will give no electrical signal for any and all 0 digits and an electrical signal of a defined polarity for any and all 1 digits.

For a slack coupling structure, for instance one of the type shown in FIG. 9, and wherein the required readouts must be marked by signals of opposite polarities for the binary values 1 and 0, the above read-in operation is repeated with substitution for the mask 17 of another mask representing a pattern of perforations complementary to the perforations 19. The term "complementary"d ("negative" will also be suitable in this respect) means that the substitute mask presents perforations at all locations in its surface which do not correspond to the locations of the perforations 19 of mask 17. During the heating and cooling steps, the applied orienting magnetic field is in a direction opposite to the first. This second read-in operation does not affect the previously read-in information since the memory points already impressed in the antiferromagnetic layer from the first will not reach a read-in destroying temperature.

Another method consists of first heating the complete structure without a mask and letting it cool while an orienting magnetic field of a first direction of magnetization is applied. The structure consequently is totally magnetically organized so as to, at any and all of its memory points, one binary digital value, for instance 1. Then a second step is made with a perforated mask at all points which must record a digital value 0, in presence of an orientating magnetic field of reverse direction with respect to the first. Such a step actually erases the digital value 1 representations at the perforation locations and ensures the read-in of digital values 0 in their place.

It may be noted that the manufacturing of such a mask as 17 is no problem at all, even for a high density of information points as, for instance, a distribution of memory points each covering an area of the order of some tens of micron on each side. Such manufacturing may be effected by the well-known printed-circuits techniques, for instance as follows. The drawing of the mask pattern is made on an enlarged scale on a transparent tracing sheet and the drawing is then photographically reduced to the actual size of the mask. A sheet of nickel or other suitable material is provided with a photosensitive layer, which is a resist for an acid etching operation. The photosensitive layer is sensitized by photographic exposure to light through the mask pattern represented by such photographically reduced drawing and thereafter the sheet is etched with an acid in all parts unprotected by the photosensitive resist (washing having removed all unexposed parts of the photosensitive layer).

Illustratively, for a magnetic structure comprising, on a heat resisting glass substrate such as 3, a ferromagnetic layer made of an alloy such as the one commercially known as "Permalloy" (an alloy of nickel and iron approximately in a 80/20 percent ratio in weight), having an approximate thickness of, for instance, 2,000 A., and an antiferromagnetic layer in an alloy of nickel-iron-manganese, of a thickness of the order of 500 to 600 A (a method for producing such an alloy will be hereinafter described), in a plate having for instance a square shape the sides of which are 10 cm. in length, the useful light pulse energy for a read-in operation lasting about one millisecond will only be of the order of 8 Joules. The plane of the mask may be spaced from the surface of the magnetic structure by about one-tenth of a millimeter.

Figure 15:
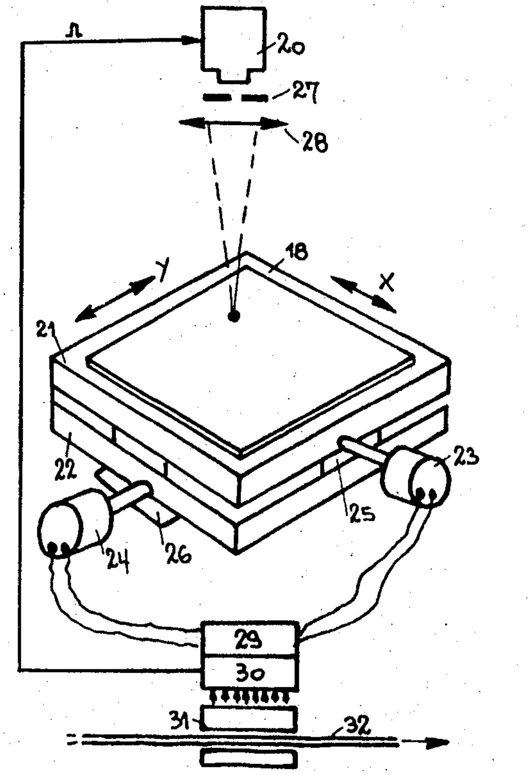
FIG. 15 shows another read-in arrangement for the stores.

A read-in operation may equally be made with a sequential system of the binary digits, as shown for instance in the arrangement of FIG. 15. This comprises two plates 21 and 22 respectively attached to sliders 25 and 26 and respectively displaced along the X and Y directions of coordinates from the control of electrical motors 23 and 24, which are preferably step motors. The magnetic structure member 18 is placed in a well defined position on the upper plate 21. A read-in head, comprising a gas-type laser 20 for instance, the light from which is diaphragmed at 27 and focused in the plane of the surface of the member 18 through optics 28, is employed as heat generator. The light focusing is such that the dimension of the light spot substantially corresponds to the required dimension of a memory point.

A magnetic or perforated tape 32 bears the read-in program for the binary digital values 1 (for instance) to be read into the store. In other words, such a tape is prepared for sequentially recording the X and Y coordinates of any memory point at which a binary value 1 representation must be obtained. The tape passes through a tape-reader 31. Each time a pair of X-Y coordinates issues from the tape-reader, and is temporarily stored at 30, a control circuit 29 correspondingly control the positioning of the motors 23 and 24. Note that the steps of said motors may be defined from the decoding of the numerical codes from the tape 32. Each positioning operation also initiates the activation of the laser 20 for a light pulse which heats the point of the magnetic structure 18 which has been so positioned at the perpendicular thereof. The latter operation is initiated from the temporary store 30 which includes sequential control reading circuits as is usual in tape controlled equipment of this type. The heating is such that the point is brought temporarily to the disorder temperature of the antiferromagnetic layer. As an orienting permanent magnetic field is applied to the structure 18, in parallel relation to one side of the structure, i.e. to one coordinate axis, each reading from the tape will produce the read-in of a digital value 1 at the memory point of the readout coordinates. The motors may control the movement of the plates from micrometric nuts. Actually, numerical positioning controls are already known, which have a precision of positioning appropriate to such a read-in operation. Consequently further details of the control are not essential to the present disclosure.

For a magnetic structure such as defined above, the peak power required of the gas laser at each "flash" thereof is about 0.2 Watts for a duration of a light pulse equals to about 1 millisecond and a light wavelength from 0.6 to 1 micron.

As in the above-described case for a global read-in, such a numerical control system may be operated in two successive steps when the magnetic structure 18 is formerly in an unorganized magnetization condition and when, for the readouts, signals of opposite polarities are wanted for representing the digital 0's and the 1's. A single operation will suffice when the structure is already organized in a magnetization condition storing a determined binary digital value at all and any memory points thereof. A single operation will further suffice when, starting from an unorganized magnetic structure, the readout conditions must be the presence of a signal for one of the binary digital values and the absence of a signal for the other one.

It is apparent from the above that a store according to the invention may be easily erased by bringing the magnetic structure to a temperature higher than the disorder temperature of the antiferromagnetic layer it comprises. When made in presence of an orienting magnetic field, and a cooling under such condition, a read-in is or may be effected simultaneously with the erasing step, as also obvious from the above. Of course, when the store includes conductor arrays, they must be removed from the magnetic structure prior to either erasing or read-in.

When the store include conductor arrays, they are applied to the magnetic structure after the read-in is made. The manufacture and positioning of such arrays may be made according to already known methods as, for instance by printed-circuit techniques. The arrays may for instance be etched from a two-face metallic coating of a very thin insulating sheet of a plastic material of the type known under the commercial trademark "MYLAR." Thereafter the sheet carrying the arrays may be glued on the surface of the magnetic structure with an appropriate dielectric resin after the sheet and the surface have been previously correctly indexed. It is easy to maintain a precision less than 10 microns for the printing of the conductors as well as for the uniting operation (and of course for the read-in of the memory points in the structure). Considering the relative positioning of the sheet and the structure, it is even easy to obtain a precision of the order of 3 to 4 microns for an area of about $10\times10$cm.$^2$. As each area of a memory point may be of the order of 100 microns, such conditions may be largely preserved. Of course, increasing the density of storage requires a corresponding increase in the accuracy of indexing.

Considering now the materials for embodying the thin film magnetic structures according to the invention: ferromagnetic property materials are numerous and well known as, for instance and illustratively, cobalt, nickel-iron alloys and complexes of such materials. Similarly antiferromagnetic materials are well known as for instance cobalt oxide, chromium oxide and iron-nickel-manganese alloys. By way of example a structure according to the invention may comprise the following pairs of layers: cobalt/cobalt oxide, nickel-iron/chromium oxide, nickel-iron/nickel-iron-manganese, and so on. All such thin magnetic layers may be produced from deposition under vacuum, i.e. evaporation process, of the component elements under well-known controlled conditions, mainly for obtaining the suitable ratios in the alloys. Further, a few embodiments will be described with reference to the pairs of material constituted by nickel-iron (ferromagnetic) and nickel-iron-manganese (antiferromagnetic) structures.

Considering first a structure as shown in FIG. 9*a*, a first thin layer 5 of nickel-iron alloy of the 80 percent iron/20 percent nickel kind is coated on the carrier 3, which may be a high temperature dielectric glass. The layer 5 is for instance of a thickness neighboring 1,250 A. It is coated in presence of a magnetic field defining an axis of anisotropy for the film and the field will be present in all the further steps to be described. Thereafter, from a further evaporating process, a very thin layer of a nonmagnetic metal, gold for instance, is coated to a thickness of about 45 A. Thereafter a further iron-nickel layer is coated on the gold film up to a thickness of about 350A for instance. The coating is effected at a temperature of the order of 300° C. Further, at the same temperature is ensured a coating of manganese 7, as shown in FIG. 9*b*, up to a thickness of about 150 to 200A. The structure is baked at 300° C. for about 1 hour. During this baking, the manganese diffuses from thermal process in the upper portion of the layer 2 and consequently the antiferromagnetic layer 1 is obtained with a tight coupling to the ferromagnetic layer 2 proper. Obviously the above-defined steps could be reversed for obtaining the antiferromagnetic layer underlying the ferromagnetic layers, i.e. coating first the substrate 3 with a layer of manganese, evaporating the nickel-iron layer over the manganese, then the gold film and finally the second ferromagnetic layer 5. The baking operation will give a similar result as the one above, the manganese diffusing in the layer 2 to constituting the layer 1. The latter method has the advantage in that the first coated manganese layer is protected during the baking operation, which avoids conditioning the atmosphere as in the first method, as manganese is not a stable element in uncontrolled atmosphere.

It is obvious that the method results in a concentration of manganese within the antiferromagnetic layer which varies with the thickness. Actually, one must understand that the temperature of disorder as herein above defined is not a single value but rather it exists within a temperature interval range from a minimum $T_N$ value (which will be the highest temperature for the use of the store) and a maximum $T_N$ value, which will however be suitably relatively low for easing the read-in operation or operations. Illustratively, such a temperature interval, as obtained from the above-described conditions of operation, is from about 100° C. to about 200° C. Consequently, the read-in operations and the normal operation of the store will be easily satisfied. The coupling field $H_i$ is of about 60 Oersteds with a coupling energy between the layers 1 and 2 of about 0.15 erg/cm.$^2$.

The value of the coupling field increases with the length of time of the diffusion process, as may be proved from successive baking operations. However the temperature of disorder remains substantially unchanged. For such matters, one may refer to a publication in the names of Messrs. O. Massenet, R. Montmory and L. Neel under the title "Magnetic Properties of multilayer films of Fe-Ni-Mn, Fe-Ni-Co and of Fe-Ni-Cr" in "-Proceedings of Intermagn Conference," 1964, *n*12–2, see mainly FIG. 2 and the description thereof.

Of course, it is possible to obtain a ternary alloy layer of Fe, Ni and Mn from simultaneous evaporation of these three elements in the required proportions, corresponding to the above. The resulting layer presents a substantially homogeneous distribution of manganese throughout its thickness. Here again, it is the temperature maintained in the plane of the layer during its formation which determines the temperature $T_N$ of the antiferromagnetic alloy as it has been experimentally proved that a variation by a coefficient 4 of relative concentrations of iron, nickel and manganese in the resulting solid solution constituting the layer does not react in any substantial fashion on the value of the magnetic coupling field and the disorder temperature, so far the application of the magnetic structures in magnetic stores is concerned.

Such a phenomenon may be explained by considering that the only important factor is the relative interaction profile between iron-nickel and manganese and that the coupling between the iron-nickel layer and the iron-nickel-manganese layer is a phenomenon of exchange of spins between adjacent spins and consequently occurs at atomic distance scale. The useful contact territory between the two layers is actually restricted to a few number of atomic distances whereas the interdiffusion of the atoms of manganese and iron-nickel, for the concerned temperatures, concerns far larger distances.

In a structure according to FIG. 9 or FIG. 4, a further ferromagnetic layer 5 is coupled to the layer 2 through a very thin film 6 the thickness of which determines such a coupling. A layer 2 is very tightly coupled to the antiferromagnetic layer 1, it is the layer 5 which is used as a "readout" layer in the store, i.e. it is the magnetization of the memory points in said layer 5 which will rotate as it has been described in relation to FIGS. 10 and 11, and the magnetization in Layer 2 will remain practically unaffected.

In an embodiment such as shown in FIG. 9, the useful readout signal has an amplitude higher than 1 millivolt for pulses of the field $H_M$ presenting a rising leading front of the order of 10 nanoseconds.

Without such a specialized readout layer 5, the magnetic structure must be adapted to enable the layer 2 to operate as a readout layer. The layer 2 is normally coupled to the layer 1 by a coupling field $H_i$ of value too high to permit variations of magnetizations at the memory points of said ferromagnetic layer 2. First, a reduction of the coupling field may be obtained as shown in FIG. 3 by the interposition of a thin nonmagnetic layer 4 between the layers 1 and 2. However, though such an arrangement is workable, it presents a tendency to some instability and is of relatively low response to the application of readout pulses. Of course, what is presently discussed is the case of the stores comprising conductor arrays and electrical readout as, obviously, there is no problem of this kind when structures according to FIG. 1 are used in optically readout stores.

Experiment demonstrated to Applicants that when a magnetic composite structure according to FIG. 1 is cooled, when prepared, in the presence of a magnetic field of alternating character, from the disorder temperature range to a lower temperature, the coupling between the ferromagnetic and antiferromagnetic layers disappears. Preferably though not imperatively, said magnetic field is oriented in the direction of the anisotropy axis of the ferromagnetic layer. On the other hand, such a decoupled structure, when heated to the disorder temperature range and cooled anew in the presence of a permanent magnetic field, returns to a condition of tight coupling between its layers.

The following method may consequently be used for preparing a structure as shown in FIG. 1 or FIG. 12 and adapted to an electrical readout in a store having adjacent conductor arrays.

Once a two layer structure prepared as previously described, and prior to a read-in operation, the structure is heated in the range of its disorder temperature in the presence of an alternating magnetic field oriented in the direction of the anisotropy axis of the ferromagnetic layer. The amplitude of the field may be about 20 Oe, and the structure is thereafter cooled in the presence of such a magnetic field. The result is that the coupling between the ferromagnetic and antiferromagnetic layers disappears. Then the whole set of information binary digits of a single value, 0's for instance, are read-in at the appropriate memory points from localized application of heat up to said disorder temperature range in the presence of a permanent magnetic field of such an amplitude that it saturates the complete ferromagnetic layer in one direction of the anisotropy axis thereof. Cooling under such field is effected, which reestablishes the tight coupling between the two layers solely at the read-in points and consequently "blocks" the magnetization in said ferromagnetic layer at such memory points. The resulting magnetic structure of the store has a uniaxial anisotropy saturated ferromagnetic layer with only the read-in memory points blocked from the interaction with the antiferromagnetic layer. Any other memory point, when read-in, will give an output electrical signal since the ferromagnetic layer will have its magnetization rotated as has been explained hereinbefore with reference to FIG. 16, as such point is not coupled to the antiferromagnetic layer. A binary digit 1 will consequently be read out at any such uncoupled memory point. On the other hand, each memory point at which the ferromagnetic and antiferromagnetic layers are tightly coupled will give no output electrical signal at all when read out. In the store, the magnetic structure must be submitted to a low value magnetic field, oriented in either one or the other of the directions of the anisotropy axis, said field acting for resetting back the magnetization of the 1's memory points after each readout operation thereof.

One of the advantages of such a magnetic structure arrangement is that it is deprived of demagnetizing fields at the memory points since the ferromagnetic layer is saturated in a rest direction, and consequently the possibility of increase of the density of information is higher than for the preceding structures having two directions along the anisotropy axis for representing the two binary values and which, obviously then, present such demagnetizing fields.

Further, since the ferromagnetic layer remains saturated in the rest condition, whatever is the information content of the store, it is not imperative to apply an external magnetic field for the read-in operation provided the ferromagnetic layer has been previously saturated in the one or the other of the directions of its anisotropy axis.

What I claim is:

1. A thin layer magnetic structure for use as a binary information store comprising:

an antiferromagnetic alloy layer; and a ferromagnetic alloy layer of uniaxial anisotropy, said layers being so positioned with respect to each other to effect a tight magnetic exchange interaction of the momentums of their magnetic and relatively aligned spins.

2. A thin layer magnetic structure for use as a binary information store comprising:

an antiferromagnetic alloy layer; and a ferromagnetic alloy layer, said layers being in contact with each other and being in tight magnetic exchange interaction coupling only at localized points of their contact area and having zero magnetic coupling outside said localized points in their contact area.

3. A thin layer magnetic structure as defined by claim 2 in which said ferromagnetic alloy in that portion having zero magnetic coupling with said antiferromagnetic alloy is magnetically saturated in the direction of its axis of anisotropy.

4. A thin layer magnetic structure for use as a binary information store comprising:

an antiferromagnetic alloy layer;

a ferromagnetic alloy layer of uniaxial anisotropy; and a thin film of nonmagnetic material interposed between and in contact with said layers, said layers exhibiting magnetic exchange interaction of the momentums of their relatively aligned spins through said nonmagnetic material.

5. A thin layer magnetic structure for use as a binary information store as defined by claim 4 in which said nonmagnetic material is electrically conductive.

6. A thin layer magnetic structure for use as a binary information store comprising:

an antiferromagnetic alloy layer; and a ferromagnetic alloy layer; say layers being so positioned with respect to each other as to effect a tight magnetic exchange interaction of the momentums of their magnetic and relatively aligned spins, said antiferromagnetic alloy layer being a ferromagnetic alloy doped with a metal imparting an antiferromagnetic character.

7. A thin layer magnetic structure as defined by claim 6 in which the ferromagnetic material in both layers is the same alloy.

8. A thin layer magnetic structure as defined by claim 7 wherein said ferromagnetic alloy comprises an alloy or iron and nickel and said doping metal is manganese.

9. A thin layer magnetic structure for use as a binary information store comprising:

an antiferromagnetic alloy layer;

a first ferromagnetic alloy layer; said layers contacting each other and being tightly magnetically coupled throughout their entire area of contact;

a thin film of nonmagnetic material overlying said first ferromagnetic alloy layer;

and a second ferromagnetic alloy layer overlying said thin film of nonmagnetic material and loosely magnetically coupled to said first ferromagnetic layer.

10. A thin layer magnetic structure as defined by claim 9 in which said nonmagnetic material is electrically conductive.

11. A thin layer magnetic structure for use as a binary information store comprising:

an antiferromagnetic alloy layer; and a ferromagnetic alloy layer of uniaxial anisotropy; said layers being so arranged with respect to each other that there is magnetic interaction therebetween and wherein said ferromagnetic layer and that portion of said antiferromagnetic layer adjacent thereto include a first set of localized points of a first direction of magnetization and a second set of localized points of a reverse direction of magnetization, both directions being oriented along the anisotropy axis of said ferromagnetic layer.

12. In combination, a binary digit information store of the thin film magnetic type which includes at least one antiferromagnetic alloy layer and one ferromagnetic alloy layer, said layers being tightly mutually magnetically coupled, and a readout means including an optical electronic scanning apparatus arranged to scan the surface of the store.

13. In combination with a binary digit information store of the thin magnetic film type including an antiferromagnetic alloy layer, a first ferromagnetic layer mutually tightly magnetically coupled thereto, a nonmagnetic thin film coating a surface of said first ferromagnetic layer and a second ferromagnetic alloy layer coating said thin magnetic film, readout means of the electrical pulse activated type comprising a pair of arrays of conductors arranged to closely overlie said store.

14. The combination defined by claim 13 in which one array of conductors is arranged at right angles to the axis of anisotropy of said ferromagnetic layer and in which means are provided for generating a magnetic field perpendicular to the axis of anisotropy and simultaneously applying electrical pulses to the conductors of said array.

15. In combination with a binary digit thin film magnetic store of the type which includes an antiferromagnetic alloy layer, a nonmagnetic thin film coated on a surface of said alloy layer and a ferromagnetic alloy layer coated over said thin film, readout means for said store of the electrical pulse activated type comprising a pair of arrays of conductors arranged to closely overlie said store.

16. In combination with a binary digit store of the thin magnetic film type which includes an antiferromagnetic alloy layer and a ferromagnetic alloy layer tightly magnetically coupled thereto only at a plurality of discrete memory points, a readout means for said store of the electrical pulse activated type comprising a pair of arrays of conductors arranged to closely overlie said store.

17. The combination defined by claim 16 and including external means for generating a magnetic field, said means being so arranged with respect to said ferromagnetic layer that said layer is saturated along the direction of its axis of uniaxial anisotropy.

18. In combination with a thin layer magnetic store of the type in which a layer of an antiferromagnetic alloy is in magnetic interaction with a layer of a ferromagnetic alloy of uniaxial anisotropy, means for selectively heating discrete points of said store to the disorder temperature range of said antiferromagnetic alloy and means for thereafter cooling said store in the presence of an orienting permanent magnetic field directed along the axis of anisotropy of said ferromagnetic layer.

19. The combination defined by claim 18 in which said selective heating means includes a perforated mask of heat arresting material positioned to overlie said store and a source of coherent energy for temporarily illuminating those portions of said store underlying the perforations in said mask.

20. The combination defined by claim 18 in which said selective heating means includes a source of coherent energy and means for displacing said source over the surface of said store in accordance with a predetermined pattern of indexed positions and means for activating said source at each one of said positions.

21. The combination defined by claim 18 including means for generating an alternating magnetic field and for temporarily substituting said alternating field for said permanent field.

22. A method of preparing a thin film magnetic structure which includes a layer of antiferromagnetic alloy in magnetic mutual interaction with a layer of ferromagnetic alloy, the steps comprising:

depositing such layers by evaporation of their component elements in the presence of an orienting permanent magnetic field at a temperature higher than the disorder temperature range of the antiferromagnetic alloy; and thereafter cooling the resulting structure in the presence of a magnetic field oriented along the direction of the axis of anisotropy of the ferromagnetic alloy layer.

23. A method as defined by claim 22 which includes the further steps of:

selective heating of a predetermined pattern of points in the magnetic structure; and then cooling such points while applying an orienting magnetic field of reverse orientation with respect to the field applied in the first cooling step.

24. A method as defined by claim 22 which includes the step of depositing a thin nonmagnetic film over the surface of the first deposited layer so that said ferromagnetic and antiferromagnetic layers are separated by a nonmagnetic layer.

25. A method as defined by claim 22 in which said layers are deposited on a surface of a heat resistant dielectric substrate.

26. A method of preparing a thin film magnetic structure for use as a binary information store, which structure includes an antiferromagnetic alloy layer in mutual magnetic interaction with a ferromagnetic alloy layer, the steps comprising:

heating the magnetic structure to a temperature higher than the disorder temperature range of the antiferromagnetic alloy layer;

applying an alternating magnetic field oriented in the direction of anisotropy of the ferromagnetic alloy layer;

cooling the structure in the presence of said alternating magnetic field;

selectively heating discrete points of the cooled structure to the disorder range of temperature of said antiferromagnetic alloy layer;

applying a permanent magnetic field saturating the ferromagnetic alloy layer of the structure in one direction of its axis of anisotropy; and cooling said heated discrete points in the presence of said permanent magnetic field.

27. A method of making a thin film magnetic structure, the steps comprising:

depositing on a layer of metal a layer of ferromagnetic alloy, said metal being such that when alloyed with said ferromagnetic alloy an antiferromagnetic material results; and baking said layers at a temperature higher than the disorder temperature of said antiferromagnetic alloy to cause thermal diffusion of said metal into a part of the thickness of said ferromagnetic alloy.

28. A method as defined by claim 27 in which said metal is manganese and said ferromagnetic alloy is an alloy of iron and nickel.

29. The method defined by claim 27 in which said baking step is continued for a period sufficient to cause thermal diffusion of said metal into the complete thickness of said ferromagnetic alloy and including the additional step of depositing on the resulting antiferromagnetic layer, an additional layer of a ferromagnetic alloy.

30. The method defined by claim 27 in which said baking step is continued for a period sufficient to cause thermal diffusion of said metal into the complete thickness of said ferromagnetic alloy and including the steps of depositing a thin nonmagnetic layer on the surface of the resulting antiferromagnetic alloy and thereafter depositing on the surface of said nonmagnetic layer a further layer of a ferromagnetic alloy.